United States Patent [19]

Araki

[11] Patent Number: 5,233,469
[45] Date of Patent: Aug. 3, 1993

[54] IMAGING OPTICAL SYSTEM USING INDEX DISTRIBUTION TYPE OPTICAL ELEMENTS

[75] Inventor: Keisuke Araki, Tokyo, Japan

[73] Assignee: Canon Kabushiki Kaisha, Tokyo, Japan

[21] Appl. No.: 794,841

[22] Filed: Nov. 21, 1991

Related U.S. Application Data

[63] Continuation of Ser. No. 259,205, Oct. 18, 1988, abandoned.

[30] Foreign Application Priority Data

Oct. 22, 1987 [JP] Japan ............................ 62-267888

[51] Int. Cl.⁵ .................... G02B 3/00; G03B 27/44
[52] U.S. Cl. ............................... 359/652; 359/654; 355/1
[58] Field of Search ............ 350/96.18, 413, 320, 350/167, 163–167, 413, 96.1, 96.2–96.34; 355/1, 46, 52, 53, 18, 50, 55; 359/649–655, 642, 648, 663; 385/116–124

[56] References Cited

U.S. PATENT DOCUMENTS

| | | | |
|---|---|---|---|
| 4,050,811 | 9/1977 | Russell | 355/46 |
| 4,349,248 | 9/1982 | Rees | 350/413 |
| 4,359,267 | 11/1982 | Appel | 350/96.25 |
| 4,373,780 | 2/1983 | Lama | 350/96.25 |
| 4,389,655 | 6/1983 | Baves | 355/1 |
| 4,405,207 | 9/1983 | Kay | 359/642 |
| 4,640,592 | 3/1987 | Nishimura et al. | 350/96.24 |
| 4,641,944 | 2/1987 | Honda et al. | 355/1 |
| 4,692,015 | 9/1987 | Loce et al. | 355/46 |
| 4,719,488 | 1/1988 | Sentani et al. | 355/1 |
| 4,750,022 | 6/1988 | Araki | 355/46 |
| 4,852,982 | 8/1989 | Yamamoto et al. | 350/413 |
| 4,982,222 | 1/1991 | Rees | 355/1 |

FOREIGN PATENT DOCUMENTS 59-9230  1/1984  Japan.

OTHER PUBLICATIONS

Applied Optics—"Application of Gradient Index Fibre Array to Copying Machine", Kawazu et al., vol. 19, No. 7, pp. 1105–1112; Apr. 1980.

Primary Examiner—Rodney B. Bovernick
Assistant Examiner—Thong Nguyen
Attorney, Agent, or Firm—Fitzpatrick, Cella, Harper & Scinto

[57] ABSTRACT

An imaging optical system using index distribution type optical elements comprises an imaging optical system for forming the image of an object on a light receiving surface, is formed by a plurality of optical elements of erect one-to-one magnification having a radial index distribution arranged in a row and satisfies the following relations:

$$\frac{D}{P} \leq 0.95 \text{ and } \frac{X_0}{P} \approx 2.75 + 0.5 \, x$$

where $x$ is 0 or greater integer,

D is the effective diameter of each optical element, $X_0$ is the field radius of each optical element, and P is the arrangement interval of the optical elements.

24 Claims, 4 Drawing Sheets

IMAGING OPTICAL SYSTEM USING INDEX DISTRIBUTION TYPE OPTICAL ELEMENTS

This application is a continuation of application Ser. No. 07/259,205 filed Oct. 18, 1988, now abandoned.

BACKGROUND OF THE INVENTION

This invention relates to an imaging optical system using index distribution type optical elements, and in particular to an imaging optical system suitable as the optical system of a business machine such as a copying apparatus or a facsimile apparatus.

In the optical system of a business machine such as a copying apparatus or a facsimile apparatus, a double-eye optical system of erect one-to-one magnification such as Selfoc (the trade name of a product of Japan Sheet Glass Co., Ltd.) has heretofore been used as an imaging optical system, instead of a single spherical lens system, thereby achieving compactness of the apparatus. Where optical elements of such index distribution type, i.e., the so-called radial index distribution type which is an index distribution radially symmetrical about the optic axis, are arranged in the form of an array, it is practised to arrange index distribution type optical element arrays in two rows proximate to each other and in staggered relationship, as shown, for example, in Japanese Utility Model Publication No. 59-9230 in order to eliminate irregularity of the quantity of light on the image surface. However, the use of a plurality of rows of arrays leads to a great number of optical elements, which in turn leads to a high cost and further to the necessity of very high accuracy of arrangement and difficulties in manufacture.

Figure 1:
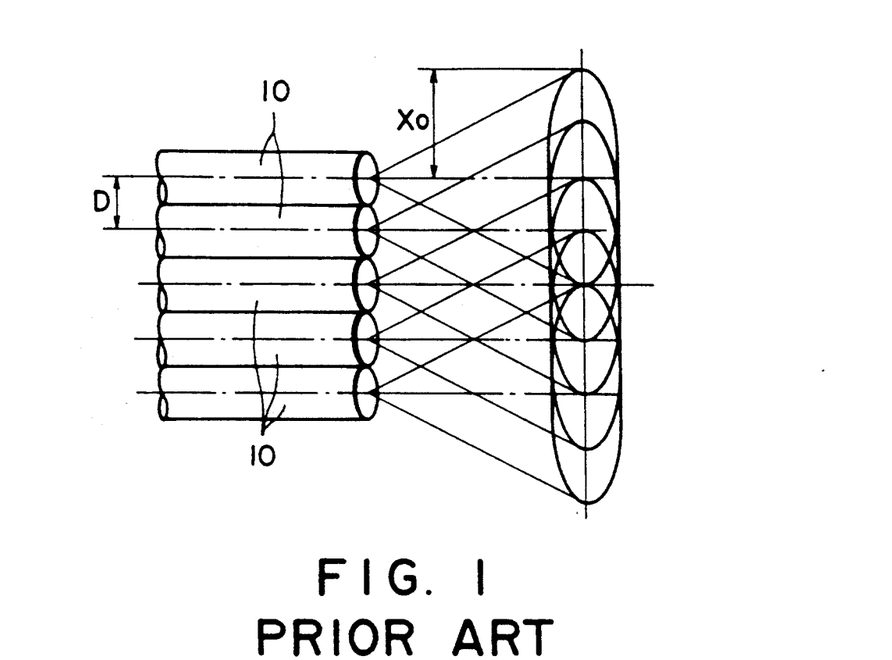
FIG. 1 illustrates index distribution type optical elements used in the imaging optical system of the prior art.

So, it has heretofore been desired to arrange a plurality of index distribution type optical elements in a row to thereby make an imaging optical system of erect one-to-one magnification, and U.S. Pat. No. 4,719,488 shows an imaging optical system of a construction in which index distribution type optical elements are densely arranged in a row. FIG. 1 of the accompanying drawings illustrates the imaging optical system of U.S. Pat. No. 4,719,488. Index distribution type optical elements 10 are arranged in a row, and light fluxes from the optical elements 10 are superposed one upon another and imaged on the imaging plane. However, in this example of the prior art, to minimize the arrangement pitch irregularity of the quantity of light, it has been necessary to suppress the degree of superposition Mo as follows:

$$Mo = \frac{Xo}{D} = 2.75 + 0.5x \quad (1)$$

where x is 0 or greater integer and Xo is the field radius of said optical elements and D is the effective diameter of said optical elements. Where at this time, the conjugate length TC has been determined by mechanical arrangement conditions, there is the following relation:

$$Zo = \frac{\frac{\pi}{2} + \sin^{-1}\left(\frac{1}{2Mo}\right)}{\frac{\pi}{2} + \sin^{-1}\left(\frac{1}{2Mo}\right) + \frac{\sqrt{4Mo^2 - 1}}{n_o}} \cdot (TC) \quad (2)$$

where $n_o$ is the central refractive index of the index distribution, and therefore the length Zo of the optical elements can only assume desultory values in conformity with the desultory Mo of formula (1), and it has been difficult to adjust Mo to the length of the optical elements which is optimum in terms of aberrations for the index distribution characteristic of the optical elements. Also, conversely, if the length Zo of the optical elements is determined so that the aberration characteristic becomes optimum under a certain index distribution (the central refractive index is $n_o$ and the secondary distribution constant is g), the degree of superposition Mo is $$Mo \approx -\frac{\sec\left(\frac{gZo}{2}\right)}{2}$$

and therefore, there is not provided a degree of superposition conforming to the condition (1), and this has led to the disadvantage that although it is good in terms of aberrations, the pitch irregularity of the quantity of light becomes great.

Also, U.S. Pat. No. 4,349,248 and U.S. Pat. No. 4,373,780 show imaging optical systems of a construction in which index distribution type optical elements are arranged in a row at predetermined intervals, but in these imaging optical systems, the pitch irregularity of the quantity of light occurs and a desired imaging performance is not obtained.

SUMMARY OF THE INVENTION

It is an object of the present invention to eliminate the above-noted disadvantages peculiar to the above-described imaging optical systems using the index distribution type optical elements according to the prior art and to provide an imaging optical system using index distribution type optical elements in which the resolution and the conjugate length can be optimized by the index distribution and the length of the optical elements without being subject to the limiting condition of the pitch irregularity of the quantity of light by an array.

It is a further object of the present invention to provide an imaging optical system using index distribution type optical elements which is easy to manufacture and low in cost.

The above objects of the present invention are achieved by satisfying, in an imaging optical system formed by a plurality of conventional index distribution type optical elements arranged in a row of array, the following relations:

$$\frac{D}{P} \leq 0.95 \text{ and } \frac{Xo}{P} \approx 2.75 + 0.5x$$

where x is 0 or a greater integer such that the relationship Xo/P follows a linear progression. where D is the effective diameter of each optical element, Xo is the field radius of each optical element, and P is the arrangement interval of the optical elements.

DESCRIPTION OF THE PREFERRED EMBODIMENTS

Figure 2:
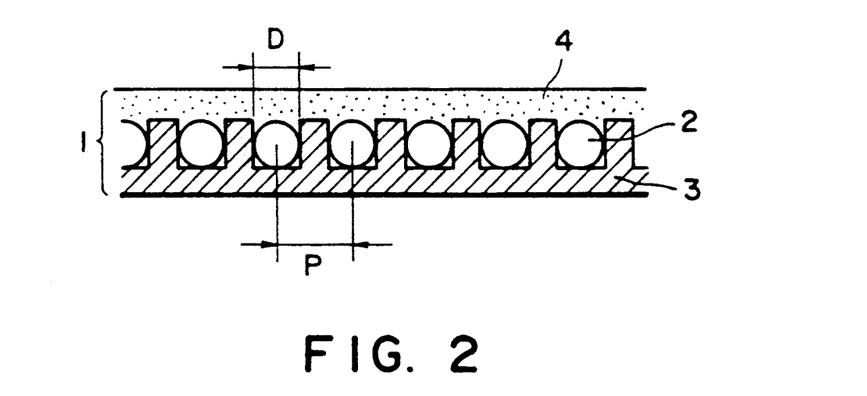
FIG. 2 illustrates index distribution type optical elements used in the imaging optical system of the present invention.

FIG. 2 illustrates index distribution type optical elements used in the imaging optical system of the present invention. In this figure, the index distribution type optical elements 2 are held by a support member 3 formed with parallel optical element supporting grooves at a pitch P, and a plate-like array 1 is constructed with the grooves filled with a known opaque supporting and solidifying member 4 for light interception and fixing.

Figure 3:
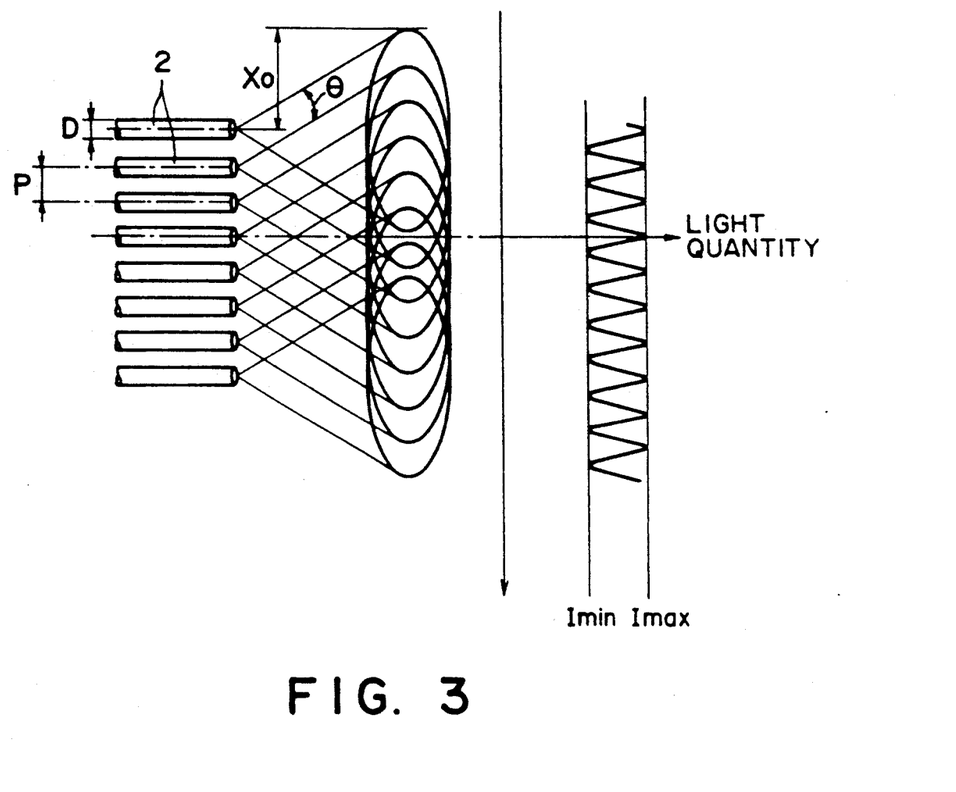
FIG. 3 shows the illumination irregularity of an image obtained by a double-eye imaging optical system formed by index distribution type optical elements arranged in a row.

FIG. 3 shows the manner of distribution of the quantity of light on the imaging plane when the optical elements 2 are arranged in a row such that the relationship Xo/P follows a linear progression. Here, Xo is indicative of the field radius of the optical elements, D is indicative of the effective diameter of the optical elements, and P is indicative of the arrangement interval of the optical elements. As shown in FIG. 3, light fluxes from the optical elements 2 are superposed one upon another on the imaging plane and imaged thereon, and the degree of superposition M is represented by $$M = Xo/P.$$

Also, the light fluxes are numerously superposed one upon another and imaged, whereby irregularity of the quantity of light is caused, and the irregularity ΔI of the quantity of light is expressed as $$\Delta I = \frac{Imax - Imin}{Imax},$$

where Imax is the quantity of light of the brightest portion and Imin is the quantity of light of the darkest portion.

Figure 4:
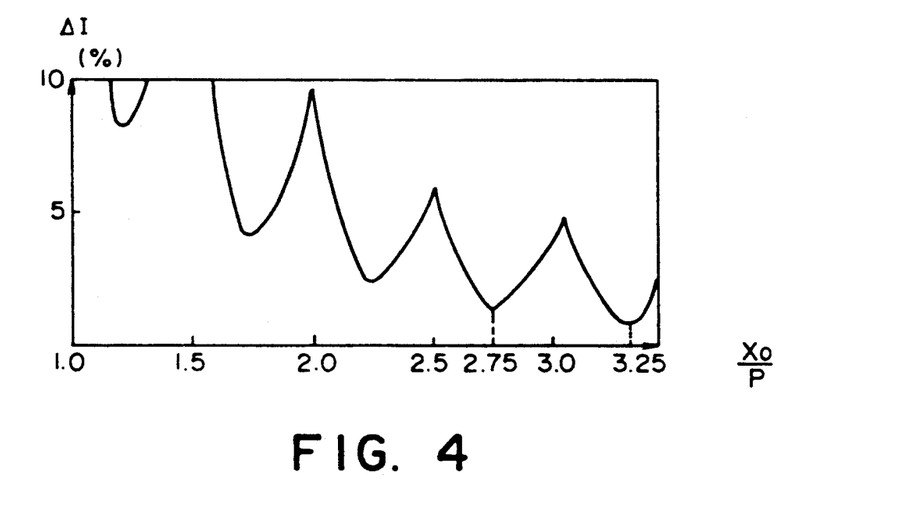
FIG. 4 is a graph showing the relation between the degree of superposition M and the illumination irregularity ΔI in a double-eye imaging optical system formed by index distribution type optical elements arranged in a row.

The relation between the irregularity ΔI of the quantity of light and the degree of superposition M=Xo/P of the images when the index distribution type optical elements are disposed in a row is shown in FIG. 4. In FIG. 4, the ordinate represents the irregularity ΔI of the quantity of light and the abscissa represents the degree of superposition M, and as is apparent from FIG. 4, the irregularity of the quantity of light can be sufficiently minimized by selecting the degree of superposition M to the vicinity of M=Xo/P=2.75+0.5× (x is 0 or greater integer). However, the vicinity of M=2.75 or 3.25 is preferable. This is because the irregularity ΔI of the quantity of light does not become so small even if M assumes a value greater than 3.25 and further, if M becomes great, it will be necessary to sharply bend the incident light flux in order that imaging may be effected by optical elements of the same length and the same effective diameter and accordingly, aberrations become ready to occur. Further, it is because the index distribution of a steep gradient must be applied to the optical elements and this is difficult in the manufacture of the optical elements. Furthermore, if M becomes great, the resolving power will be more or less deteriorated and therefore, a value in the vicinity of M=2.75 or 3.25 is desirable. Here, the range of the allowable error of the value of M is determined by the irregularity ΔI of the quantity of light, and there is no problem if ΔI is usually within 1.5%-2%. Accordingly, if M is, for example, within the range of 2.6-2.8, it will be allowed.

The support member 3 for the optical elements used in the present invention is used to keep the relation that Xo/P=2.75+0.5× (x is 0 or greater integer).

In the index distribution type optical elements used in the imaging optical system according to the present invention, the relation that D/P<1 is satisfied. However, it is very difficult and costly to precisely process the outer peripheral surface of the optical element. Also, the outer peripheral surface of the optical element needs to be finished roughly in order that the leaking light from the optical element may not enter the adjacent optical elements. Where the outer peripheral surface of the optical element is not finished roughly, a known light-intercepting member (not shown) needs to be provided between the adjacent optical elements Accordingly, if the condition that D/P≦0.95 is satisfied, the optical element will be low in cost and easy to manufacture.

The imaging optical system using the index distribution type optical elements according to the present invention is characterized in that the effective diameter D of the optical elements and the arrangement interval P of the optical elements are made to differ (D/P<1). By changing the effective diameter D of the optical elements and the arrangement interval P of the optical elements, the resolution and the conjugate length can be optimized by the index distribution and the length of the optical elements without being subject to the limiting condition of the pitch irregularity of the quantity of light by the array, and the pitch irregularity of the quantity of light by the array can be minimized by the degree of freedom of the arrangement interval P. Also, since D/P<1, there is the effect that the cost is reduced by a decrease in the volume of the optical elements.

Now, if the value of D/P is too small, aberrations will become worse and the quantity of light on the imaging plane will become smaller. If the sensitivity of a photosensitive drum which is the imaging plane (the light receiving surface) and an image sensor such as a CCD is good, a value of said $$\frac{D}{P}$$

which is within the range of $$0.5 \leq \frac{D}{P} \leq 0.95$$

will pose no problem in use.

Particularly, where no burden is laid upon the photosensitive drum and the image sensor such as a CCD, said $$\frac{D}{P}$$

can be of a value within the range of $$0.8 \leq \frac{D}{P} \leq 0.95.$$

The angular aperture $\theta$ of the optical elements will now be described. Usually, where the imaging optical system of this type is used in a business machine or a copying apparatus which will be described later, the F-value generally referred to in a lens system is required to be of the order of 5 to 10. Also, where such imaging optical system is used in a reading apparatus such as a facsimile apparatus, the F-value generally referred to in a lens system is required to be of the order of 8.

Accordingly, with the above-mentioned F-value taken into account, the value of the angular aperture $\theta$ can be set to $6° \leq \theta \leq 20°$.

Also, in the optical elements of the present invention, it is necessary to set the value of the above-mentioned angular aperture $\theta$ with the value of the above-mentioned degree of superposition $M = Xo/P$ taken into account. That is, since the value of the degree of superposition $M = Xo/P$ is 2.75 or more, the angular aperture $\theta$ need be at least 9°. Also, if the angular aperture $\theta$ is too great, the depth of field will become shallow and the image on the image surface will be blurred even for slight deviation. Accordingly, it is desirable that with the above-mentioned degree of superposition $M = Xo/P$ taken into account, the value of the angular aperture $\theta$ be set to $9° \leq \theta \leq 15°$.

The effective diameter D of the optical elements will now be described. As described above, the imaging optical system of the present invention is of a construction in which $$\frac{D}{P} < 1$$

and therefore, there is the effect that the cost is reduced by a decrease in the volume of the optical elements. That is, it is desired that the value of the effective diameter D be made small. Also, if the effective diameter D is too small, there will arise a problem that the optical elements are liable to bend or break in the process of manufacture. Consequently, it is preferable that the value of the effective diameter D of the optical elements be set to $0.5 \leq D \leq 1.3$ (mm).

Now, the value of the effective diameter D is related also with the value of the above-mentioned degree of superposition $M = Xo/P$ and the value of the angular aperture $\theta$. Consequently, if the value of the effective diameter D of the optical elements is particularly desirably set to $0.7 \leq D \leq 1.1$ (mm), a good imaging performance will be obtained even in the case of an imaging optical system in which index distribution type optical elements are arranged in a row and in such a relation that $D/P < 1$.

Figure 5:
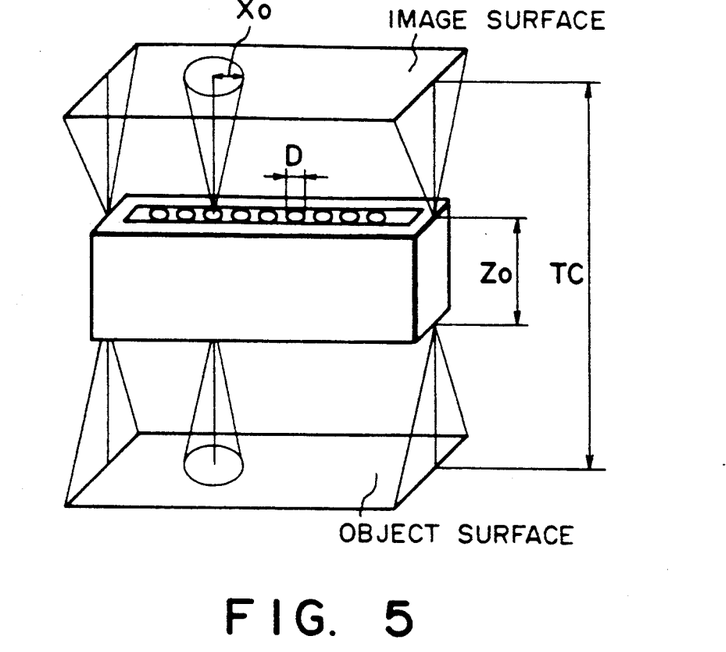
FIG. 5 shows the optical parameters of a double-eye imaging optical system formed by index distribution type optical elements arranged in a row.

A description will now be gives of the length Zo of the optical elements and the distance TC between the object and the image surface shown in FIG. 5. To keep the value of the degree of superposition $M = Xo/P$ at a predetermined value, M can be kept at a predetermined value by adjusting the fluctuation (irregularity) of the index distribution constant of the optical elements by the length Zo of the optical elements. A variation in the value of Zo is related also with the value of TC. Now, in a projection apparatus using the index distribution type optical element array of the present invention, it is necessary to dispose illuminating means between the object surface (the surface of the original) and the optical element array, and the shortest possible distance between the object and the image surface leads to the possibility achieving compactness of the apparatus.

Accordingly, the length Zo of the optical elements and the distance TC between the object and the image surface should desirably be $8 \leq Zo \leq 30$ (mm) and $25 \leq TC \leq 75$ (mm).

Figure 6A:
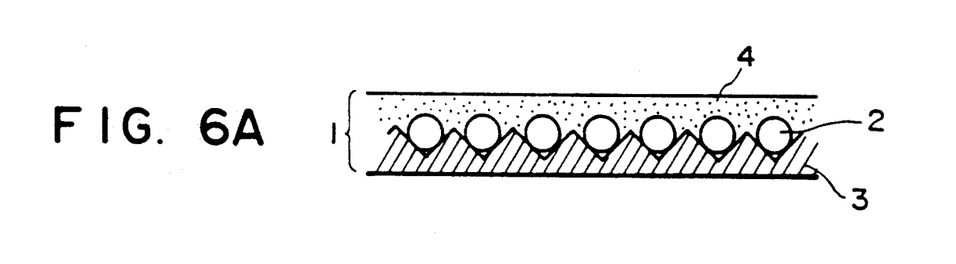
FIGS. 6A, 6B, 6C, 7A, 7B and 7C show other embodiments of the index distribution type optical elements used in the imaging optical system of the present invention.
Figure 6B:
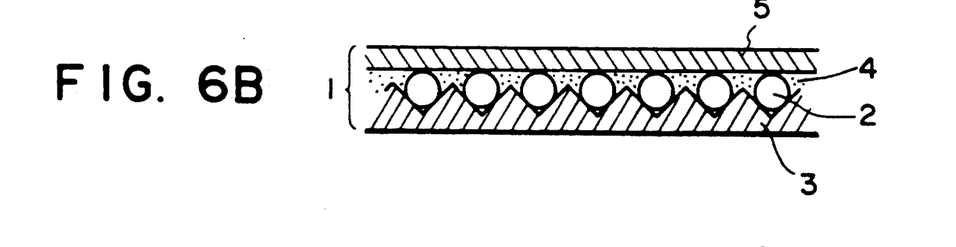
Figure 6C:
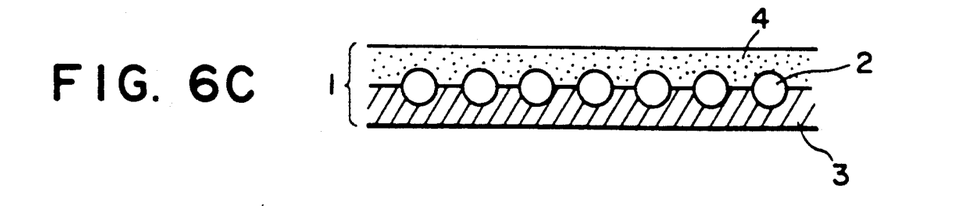

In the embodiment shown in FIG. 2, the index distribution type optical elements 2 are held by the support member 3 formed with parallel optical element supporting grooves at a pitch P, but other various shapes are conceivable as the shape of the support member 3 for the optical elements 2. Some examples of the shape of the support member 3 are shown in FIGS. 6A, 6B and 6C. FIG. 6A shows triangular grooves in which importance is attached to simplicity and arrangement accuracy. In this case, even if the optical elements are more or less irregular in diameter, they can be arranged with better parallelism than in square grooves. FIG. 6B shows an example in which the optical elements 2 are fixed in triangular grooves by a fixing member 5 from above the support plate to eliminate the slight vertical warp of the optical elements 2 relative to the optic axis. FIG. 6C shows an example in which the optical elements are arranged in semi-cylindrical grooves having a radius of curvature slightly greater than the diameter of the optical elements. Again in this example, the arrangement of the optical elements is better in parallelism than the arrangement in square grooves.

Figure 7A:
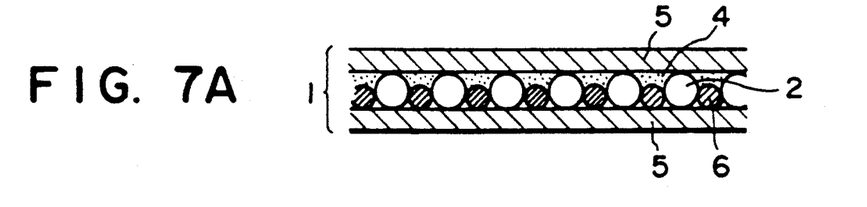
Figure 7B:
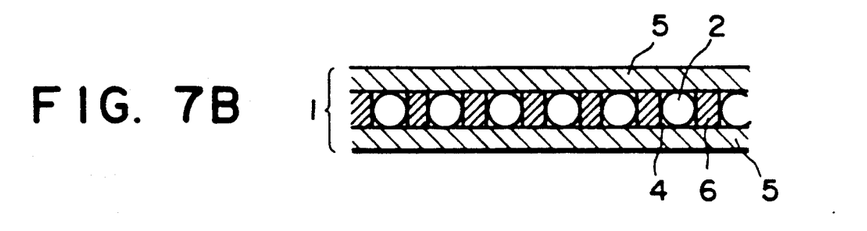
Figure 7C:
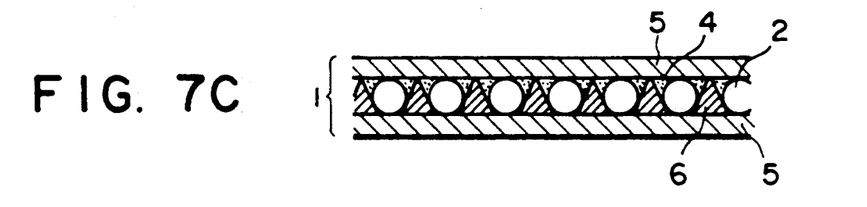

Examples in which grooves are not used but the optical elements are arranged with spacers 6 interposed therebetween are shown in FIGS. 7A, 7B and 7C. Since the spacers 6 are not the optical elements 2, the spacers need not be rods of a predetermined diameter as shown in FIG. 7A, but may be of rectangular (square) or triangular cross-sectional shape as shown in FIG. 7B or 7C. In such case, the arrangement accuracy of the optical elements 2 is determined by the accuracy of the diameter and the lengths of the sides of the spacer rods 6 and the parallelism of the spacer rods 6, but this accuracy can be provided discretely from the manufacturing process of the optical elements which are made by roughening outer walls and therefore, it is sufficiently possible to increase the arrangement accuracy even in the spacer system.

In any of the examples shown in FIGS. 6 and 7, the optical elements, after being arranged, are fixed with a known opaque material 4 being poured between the optical elements and then solidified, to thereby prevent crosstalk.

Figure 8:
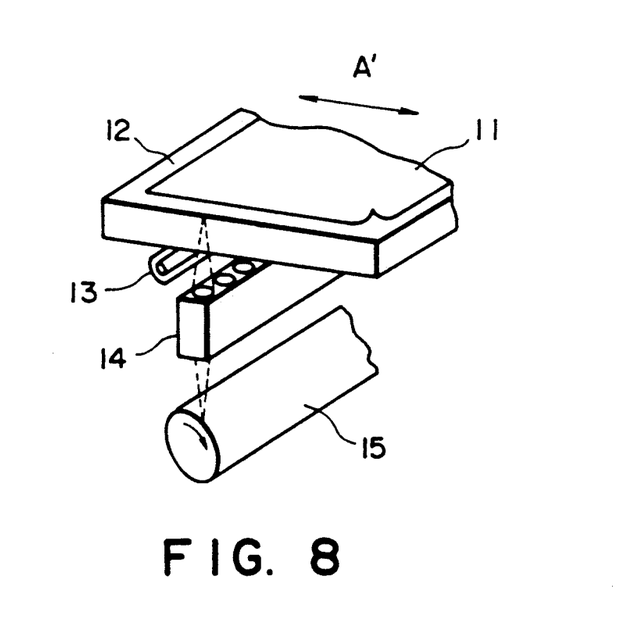
FIG. 8 shows an example in which a projection apparatus using the imaging optical system of the present invention is applied to a copying apparatus.

FIG. 8 is a schematic perspective view showing an example in which a projection apparatus using the imaging optical system according to the present invention is applied to a copying apparatus. The reference numeral 11 designates an original which is an object to be copied, and the reference numeral 12 denotes an original supporting table supporting the original thereon and movable in the direction of arrow A'. The reference numeral 13 designates illuminating means formed by a bar-like light source and a reflector and illuminating the surface of the original in a slit-like form. The reference numeral 14 denotes an imaging optical system of erect one-to-one magnification using the aforedescribed optical elements, and the reference numeral 15 designates a photosensitive drum which is a light receiving surface. The imaging optical system 14 causes the erect one-to-one magnification image of the original 11 illuminated in a slit-like form by the illuminating means 13 to be formed on the surface of the photosensitive drum 15 which is the light receiving surface (the image surface). Rotation of the photosensitive drum 15 and movement of the original supporting table 12 are effected in synchronism with each other, whereby the image of the original 11 is formed on the surface of the photosensitive drum 15. The image formed on the surface of the photosensitive drum is realized by a wellknown process (not shown).

In FIG. 8, an example has been shown in which a projection apparatus using the imaging optical system according to the present invention is applied to a copying apparatus, but of course, the present invention can also be applied to a reading apparatus such as a facsimile apparatus. In that case, an image sensor such as a CCD can be used as the light receiving surface for receiving the image of the original.

As described above, in an imaging optical system formed by a plurality of conventional index distribution type optical elements arranged in a row, the present invention can change the effective diameter D and the arrangement interval P of the optical elements to thereby optimize the resolution and the conjugate length by the index distribution and the length of the optical elements without being subject to the limiting condition of the pitch irregularity of the quantity of light by the array, and the pitch irregularity of the quantity of light by the array can be minimized by the degree of freedom of the arrangement interval P. Also, $D/P<1$, and this leads to the effect that the cost is reduced by a decrease in the volume of the optical elements.

I claim:

1. An imaging optical system using index distribution type optical elements, comprising an imaging optical system for forming the image of an object on a light receiving surface, said optical system being formed by a plurality of optical elements of erect one-to-one magnification having a radial index distribution arranged in a row, said optical system satisfying the following relations:

$$0.5 \leq D/P \leq 0.95 \text{ and } Xo/P \approx 2.75 + 0.5 \times$$

where x is 0 or a greater integer such that the relationship Xo/P follows a linear progression,
D is the effective diameter of each optical element,
Xo is the field radius of each optical element, and P is the arrangement interval of the optical elements.

2. An imaging optical system according to claim 1, wherein the value of said $\frac{Xo}{P}$ has a value in the vicinity of 2.75 or 3.25.

3. An imaging optical system according to claim 1, wherein an angular aperture $\theta$ of each of said optical elements has a value of $6° \leq \theta \leq 20°$.

4. An imaging optical system using index distribution type optical elements, comprising an imaging optical system for forming the image of an object on a light receiving surface, said optical system being formed by a plurality of optical elements of erect one-to-one magnification having a radial index distribution arranged in a row, said optical system satisfying the following relations:

$$D/P \leq 0.95 \text{ and } Xo/P \approx 2.75 + 0.5 \times$$

where x is 0 or a greater integer,
D is the effective diameter of each optical element,
Xo is the field radius of each optical element, and P is the arrangement interval of the optical elements, the effective diameter D of said optical elements being a value of $0.5 < D < 1.3$ (mm).

5. A system according to claim 4, wherein the value of said Xo/P has a value in the vicinity of 2.75 or 3.25.

6. A system according to claim 4, wherein an angular aperture $\theta$ of each of said optical elements has a value of $6° \leq \theta \leq 20°$.

7. A projection apparatus comprising:
a table for supporting an object thereon;
illuminating means for illuminating the object; and
an imaging optical system for forming an image of the object on a light receiving surface, said optical system being formed by a plurality of optical elements of erect one-to-one magnification having a radial index distribution arranged in a row, said optical system satisfying the following relations:

$$0.5 \leq D/P \leq 0.95 \text{ and } Xo/P \approx 2.75 + 0.5 \times$$

where x is 0 or a greater integer such that the relationship Xo/P follows a linear progression,
D is the effective diameter of each optical element,
Xo is the field radius of each optical element, and P is the arrangement interval of the optical elements.

8. A system according to claim 7, wherein the value of said Xo/P has a value in the vicinity of 2.75 or 3.25.

9. A system according to claim 7, wherein an angular aperture $\theta$ of each of said optical elements has a value of $6° \leq \theta \leq 20°$.

10. An imaging optical system according to claim 7, wherein a length Zo of each of the optical elements has a value of $8 \leq Zo \leq 30$ (mm).

11. An imaging optical system according to claim 7, wherein a distance TC between the object and the image surface has a value of $25 \leq TC \leq 75$ (mm).

12. A projection apparatus comprising:
a table for supporting an object thereon;
illuminating means for illuminating the object; and
an imaging optical system for forming an image of the object on a light receiving surface, said optical system comprising a plurality of optical elements of erect one-to-one magnification having a radial index distribution arranged in a row, said optical system satisfying the following relations:

$D/P \leqq 0.95$ and $Xo/P \approx 2.75 + 0.5 \times$ wherein x is 0 or a greater integer such that the relationship Xo/P follows a linear progression, D is the effective diameter of each optical element, Xo is the field radius of each optical element, and P is the arrangement interval of the optical elements, the effective diameter D of said optical elements being a value of $0.5 < D < 1.3$ (mm).

13. Apparatus according to claim 12, wherein the value of said Xo/P has a value in the vicinity of 2.75 or 3.25.

14. Apparatus according to claim 12, wherein an angular aperture $\theta$ of each of said optical elements has a value of $6° \leqq \theta \leqq 20°$.

15. An imaging optical system according to claim 12, wherein a length Zo of each of the optical elements has a value of $8 \leqq Zo \leqq 30$ (mm).

16. An imaging optical system according to claim 12, wherein a distance TC between the object and the image surface has a value of $25 \leqq TC \leqq 75$ (mm).

17. An imaging optical system using index distribution type optical elements, comprising an imaging optical system for forming the image of an object on a light receiving surface, said optical system being formed by a plurality of optical elements of erect one-to-one magnification having a radial index distribution arranged in a row, said optical system satisfying the following relations:

$D/P \leqq 0.95$ and $Xo/P \approx 2.75 + 0.5 \times$ x is 0 or a greater integer such that the relationship Xo/P follows a linear progression, D is the effective diameter of each optical element, Xo is the field radius formed on said light receiving surface by a light beam from one of said optical elements, and P is the arrangement interval of the optical elements.

18. An imaging optical system according to claim 17, wherein the value of said Xo/P has a value in the vicinity of 2.75 or 3.25.

19. An imaging optical system according to claim 17, wherein an angular aperture $\theta$ of each of said optical elements has a value of $6° \leqq \theta \leqq 20°$.

20. A projection apparatus comprising:
 a table for supporting an object thereon;
 illuminating means for illuminating the object; and
 an imaging optical system for forming the image of the object on a light receiving surface, said optical system being formed by a plurality of optical elements of erect one-to-one magnification having a radial index distribution arranged in a row, said optical system satisfying the following relations:

$D/P \leqq 0.95$ and $Xo/P \approx 2.75 + 0.5 \times$ where x is 0 or a greater integer such that the relationship Xo/P follows a linear progression, D is the effective diameter of each optical element, Xo is the field radius formed on said light receiving surface by a light beam from one of said optical elements, and P is the arrangement interval of the optical elements.

21. Apparatus according to claim 20, wherein the value of said Xo/P has a value in the vicinity of 2.75 or 3.25.

22. An imaging optical system according to claim 20, wherein an angular aperture $\theta$ of each of said optical elements has a value of $6° \leqq \theta \leqq 20°$.

23. Apparatus according to claim 20, wherein a length Zo of each of the optical elements has a value of $8 \leqq Zo \leqq 30$ (mm).

24. Apparatus according to claim 20, wherein a distance TC between the object and the image surface has a value of $25 \leqq TC \leqq 75$ (mm).

* * * * *

UNITED STATES PATENT AND TRADEMARK OFFICE
CERTIFICATE OF CORRECTION

PATENT NO. : 5,233,469

DATED : August 3, 1993

INVENTOR(S) : KEISUKE ARAKI

It is certified that error appears in the above-indentified patent and that said Letters Patent is hereby corrected as shown below:

On the title page:

[56] REFERENCES CITED

"Sentani et al." should read --Setani et al.--.

COLUMN 1

Line 55, "or" should read --or a--.

COLUMN 2

Line 59, "progression. where" should read --progression,--.

COLUMN 3

Line 36, "such that the relationship" should read --, as in Fig. 2.--.

Line 37, "Xo/P follows a linear progression." should be deleted.

Line 68, "2.75+0.5X" should read --2.75+0.5x--.

UNITED STATES PATENT AND TRADEMARK OFFICE
CERTIFICATE OF CORRECTION

PATENT NO. : 5,233,469
DATED : August 3, 1993
INVENTOR(S) : KEISUKE ARAKI

It is certified that error appears in the above-indentified patent and that said Letters Patent is hereby corrected as shown below:

COLUMN 4

Line 23, "2.75+0.5X" should read --2.75+0.5x--.

COLUMN 6

Line 3, "gives" should read --given--.

COLUMN 7

Line 24, "wellknown" should read --well-known--.
Line 60, "Xo/P≈2.75+0.5X" should read --Xo/P≈2.75+0.5x--.

COLUMN 8

Line 18, "Xo/P≈2.75+0.5X" should read --Xo/P≈2.75+0.5x--.
Line 41, "Xo/P≈2.75+0.5X" should read --Xo/P≈2.75+0.5x--.

UNITED STATES PATENT AND TRADEMARK OFFICE
CERTIFICATE OF CORRECTION

PATENT NO. : 5,233,469                     Page 3 of 3
DATED      : August 3, 1993
INVENTOR(S): KEISUKE ARAKI It is certified that error appears in the above-indentified patent and that said Letters Patent is hereby corrected as shown below:

COLUMN 9

Line 1, "Xo/P≈2.75+0.5X" should read --Xo/P≈2.75+0.5x--.
Line 33, "Xo/P≈2.75+0.5X" should read --Xo/P≈2.75+0.5x--.
Line 35, "x" should read --where x--.

COLUMN 10

Line 19, "Xo/P≈2.75+0.5X" should read --Xo/P≈2.75+0.5x--.

Signed and Sealed this

Twenty-third Day of August, 1994

Attest:

BRUCE LEHMAN

*Attesting Officer*     *Commissioner of Patents and Trademarks*